United States Patent
Hirose et al.

(10) Patent No.: US 9,371,465 B2
(45) Date of Patent: Jun. 21, 2016

(54) SILVER INK COMPOSITION

(71) Applicant: Toppan Forms Co., LTD., Minato-ku, Tokyo (JP)

(72) Inventors: Kumi Hirose, Tokyo (JP); Marina Imai, Tokyo (JP)

(73) Assignee: Toppan Forms Co., Ltd., Minato-Ku, Tokyo (JP)

( * ) Notice: Subject to any disclaimer, the term of this patent is extended or adjusted under 35 U.S.C. 154(b) by 0 days.

(21) Appl. No.: 14/371,913

(22) PCT Filed: Jan. 25, 2013

(86) PCT No.: PCT/JP2013/051590
§ 371 (c)(1),
(2) Date: Jul. 11, 2014

(87) PCT Pub. No.: WO2013/111856
PCT Pub. Date: Aug. 1, 2013

(65) Prior Publication Data
US 2015/0008376 A1 Jan. 8, 2015

(30) Foreign Application Priority Data

| Jan. 27, 2012 | (JP) | 2012-015581 |
| Jan. 27, 2012 | (JP) | 2012-015582 |
| Dec. 27, 2012 | (JP) | 2012-284711 |
| Dec. 27, 2012 | (JP) | 2012-284712 |

(51) Int. Cl.
*C09D 11/52* (2014.01)
*C09D 11/037* (2014.01)
*C09D 11/322* (2014.01)
*C08K 5/01* (2006.01)
*C08K 5/05* (2006.01)
*C08K 5/098* (2006.01)
*C08K 5/17* (2006.01)
*H01B 1/22* (2006.01)
*C09D 11/30* (2014.01)

(52) U.S. Cl.
CPC ............... *C09D 11/52* (2013.01); *C09D 11/30* (2013.01); *C08K 5/01* (2013.01); *C08K 5/05* (2013.01); *C08K 5/098* (2013.01); *C08K 5/17* (2013.01)

(58) Field of Classification Search
CPC ........ C09D 11/52; C09D 11/037; H01B 1/22; C08K 5/01; C08K 5/05; C08K 5/098; C08K 5/17
USPC .................... 106/31.92; 252/519.21
See application file for complete search history.

(56) References Cited

U.S. PATENT DOCUMENTS

| 6,358,611 | B1 * | 3/2002 | Nagasawa et al. | 428/403 |
| 7,683,195 | B2 * | 3/2010 | Suganuma et al. | 556/40 |
| 8,226,755 | B2 * | 7/2012 | Chung et al. | 106/1.19 |
| 8,445,578 | B2 * | 5/2013 | Chung et al. | 524/423 |
| 2008/0145560 | A1 * | 6/2008 | Khaselev et al. | 106/31.13 |
| 2009/0223410 | A1 * | 9/2009 | Jun et al. | 106/31.92 |
| 2013/0121872 | A1 * | 5/2013 | Matsumoto | 252/519.21 |
| 2014/0026782 | A1 * | 1/2014 | Chung et al. | 106/1.05 |

FOREIGN PATENT DOCUMENTS

| JP | A-2009-114232 | 5/2009 |
| JP | A-2009-197133 | 9/2009 |
| JP | A-2010-504409 | 2/2010 |
| JP | A-2010-196150 | 9/2010 |
| JP | A-2011-063813 | 3/2011 |
| JP | A-2011-241242 | 12/2011 |
| WO | WO2008/036752 A2 | 3/2008 |

OTHER PUBLICATIONS

English translation of JP 2009/197133; Sep. 2009.*
English translation of JP 2009/114232; May 2009.*
International Search Report issued in corresponding Application PCT/JP2013/051590, Mar. 5, 2013.

* cited by examiner

*Primary Examiner* — Helene Klemanski
(74) *Attorney, Agent, or Firm* — Hoffmann & Baron, LLP

(57) ABSTRACT

A silver ink composition Which includes a silver carboxylate having a group represented by a formula iCOOAg, an aliphatic primary amine or secondary amine having 2 to 10 carbon atoms, an acetylene alcohol represented by a general formula (2) shown below, and a hydrocarbon having 6 to 20 carbon atoms, and has a viscosity at 27° C. of 40 mPa-s or less,

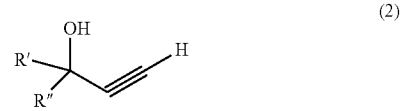
(2)

in the formula, each of R' and R" independently represents an alkyl group having 1 to 20 carbon atoms or a phenyl group in which one or more hydrogen atoms may be substituted with a substituent.

17 Claims, No Drawings

SILVER INK COMPOSITION

This application is the U.S. National Phase of, and Applicants claim priority from, International Patent Application Number PCT/JP2013/051590 filed 25 Jan. 2013, which claims priority from Japanese Patent Application No. 2012-015581 filed 27 Jan. 2012, Japanese Patent Application No. 2012-015582 filed 27 Jan. 2012, Japanese Patent Application No. 2012-284711 filed 27 Dec. 2012, and Japanese Patent Application No. 2012-284712 filed 27 Dec. 2012, each of which is incorporated herein by reference.

TECHNICAL FIELD

The present invention relates to a silver ink composition suitable for application to ink jet printing methods.

Priority is claimed on Japanese Patent Application No. 2012-15581, filed Jan. 27, 2012, Japanese Patent Application No. 2012-15582, filed Jan. 27, 2012, Japanese Patent Application No. 2012-284711, filed Dec. 27, 2012, and Japanese Patent Application No. 2012-284712, filed Dec. 27, 2012, the contents of which are incorporated herein by reference.

BACKGROUND ART

Metal silver has been widely used as a recording material, a material for the printing plate, and also as a highly conductive material because of its excellent conductivity. Typically, when employing metal silver to such applications, a technique is adopted, in which a silver ink composition containing metal silver or a component which is a metal silver forming material is prepared, the composition is deposited onto the printing substrate by various printing methods, and, if necessary, the deposited composition is heated (fired) in order to form a coating film of metal silver. In order to form a fine pattern of metal silver, ink jet printing is generally used as the printing method.

As a silver ink composition suitable for the application to an ink jet printing method as described above, those obtained by dispersing the silver nanoparticles in various organic solvents have been disclosed (see Patent Documents 1 and 2).

CITATION LIST

Patent Documents

Patent Document 1: Published Japanese Translation No. 2010-504409 of the PCT International Publication
Patent Document 2: Japanese Unexamined Patent Application, First Publication No. 2010-196150

SUMMARY OF THE INVENTION

Problems to be Solved by the Invention

However, with regard to the silver ink compositions described in Patent Documents 1 and 2, an operation of preparing the silver nanoparticles as a raw material by the reduction of silver nitrate with a reducing agent is required, and thus there is a problem in that the preparation of silver ink composition is accompanied by a complicated process.

The present invention has been developed in light of the above circumstances, and has an object of providing a silver ink composition which can be prepared by a simple method, is suitable for application to an ink jet printing method, and is capable of forming a practical amount of metal silver.

Solution to Problem

In order to solve the above problems, the present invention provides a silver ink composition which comprises: a silver carboxylate having a group represented by a formula "—COOAg", an aliphatic primary amine or secondary amine having 2 to 10 carbon atoms, an acetylene alcohol represented by a general formula (2) shown below, and a hydrocarbon having 6 to 20 carbon atoms, wherein the ink composition has a viscosity at 27° C. of 40 mPa·s or less.

It is preferable that the silver ink composition of the present invention be obtained by blending a hydrocarbon having 6 to 14 carbon atoms, and has a dynamic surface tension at 27° C. of 56 mN/m or less.

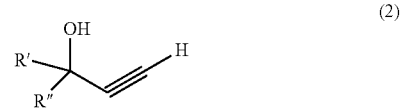

(In the formula, each of R' and R" independently represents an alkyl group having 1 to 20 carbon atoms or a phenyl group in which one or more hydrogen atoms may be substituted with a substituent.)

In the silver ink composition of the present invention, it is preferable that the aforementioned silver carboxylate be a silver β-ketocarboxylate represented by the following general formula (1).

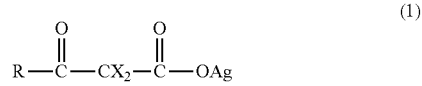

(In the formula, R represents an aliphatic hydrocarbon group having 1 to 20 carbon atoms in which one or more hydrogen atoms may be substituted with a substituent, or represents a phenyl group, a hydroxyl group, an amino group, or a group represented by general formula "R'—CY$_2$—", "CY$_3$—", "R'—CHY—", "R$^2$O—", "R$^5$R$^4$N—", "(R$^3$O)$_2$CY—", or "R$^6$—C(=O)—CY$_2$—";

Y each independently represents a fluorine atom, a chlorine atom, a bromine atom or a hydrogen atom; R$^1$ represents an aliphatic hydrocarbon group having 1 to 19 carbon atoms or a phenyl group; R$^2$ represents an aliphatic hydrocarbon group having 1 to 20 carbon atoms; R$^3$ represents an aliphatic hydrocarbon group having 1 to 16 carbon atoms; each of R$^4$ and R$^5$ independently represents an aliphatic hydrocarbon group having 1 to 18 carbon atoms; and R$^6$ represents an aliphatic hydrocarbon group having 1 to 19 carbon atoms, a hydroxyl group or a group represented by formula "AgO—";

X each independently represents a hydrogen atom, an aliphatic hydrocarbon group having 1 to 20 carbon atoms, a halogen atom, a phenyl group in which one or more hydrogen atoms may be substituted with a substituent, a benzyl group, a cyano group, an N-phthaloyl-3-aminopropyl group, a 2-ethoxyvinyl group, or a group represented by general formula "R$^7$O—", "R$^7$S—", "R$^7$—C(=O)—" or "R$^7$—C(=O)—O—"; and R$^7$ represents an aliphatic hydrocarbon group having 1 to 10 carbon atoms, a thienyl group, or a phenyl group or diphenyl group in which one or more hydrogen atoms may be substituted with a substituent).

In the silver ink composition of the present invention, it is preferable that the aforementioned R represent a linear or branched alkyl group, a phenyl group, or a group represented by the aforementioned general formula "$R^6$—C(=O)—$CY_2$—", and the aforementioned X represent a hydrogen atom, a linear or branched alkyl group, or a benzyl group.

In the silver ink composition of the present invention, it is preferable that the aforementioned silver β-ketocarboxylate be at least one selected from the group consisting of silver 2-methylacetoacetate, silver acetoacetate, silver 2-ethylacetoacetate, silver propionylacetate, silver isobutyrylacetate, silver pivaloylacetate, silver 2-n-butylacetoacetate, silver 2-benzylacetoacetate, silver benzoylacetate, silver pivaloylacetoacetate, silver isobutyrylacetoacetate and silver acetonedicarboxylate.

In the silver ink composition of the present invention, it is preferable that an aliphatic hydrocarbon group bonded to a nitrogen atom of the aforementioned primary amine or secondary amine be a linear or branched alkyl group.

In the silver ink composition of the present invention, it is preferable that the aforementioned primary amine or secondary amine be at least one selected from the group consisting of 2-ethylhexylamine, n-propylamine, n-butylamine, n-pentylamine, n-hexylamine, n-heptylamine, n-octylamine, N-methylhexylamine and N-ethylhexylamine.

In the silver ink composition of the present invention, it is preferable that the aforementioned R' and R" be linear or branched alkyl groups having 1 to 10 carbon atoms.

In the silver ink composition of the present invention, it is preferable that the aforementioned acetylene alcohols be at least one selected from the group consisting of 3,5-dimethyl-1-hexyn-3-ol, 3-methyl-1-butyn-3-ol and 3-methyl-1-pentyn-3-ol.

Effects of the Invention

According to the present invention, there is provided a silver ink composition which can be prepared by a simple method, is suitable for application to an ink jet printing method, and is capable of forming a practical amount of metal silver.

BEST MODE FOR CARRYING OUT THE INVENTION

Silver Ink Composition

The silver ink composition of the present invention is characterized by being obtained by blending a silver carboxylate having a group represented by a formula "—COOAg" (hereinafter, sometimes abbreviated simply as a "silver carboxylate"), an aliphatic primary amine or secondary amine having 2 to 10 carbon atoms (hereinafter, sometimes abbreviated as an "amine compound"), an acetylene alcohol represented by general formula (2) shown below (hereinafter, sometimes referred to as an "acetylene alcohol"), and a hydrocarbon having 6 to 20 carbon atoms (hereinafter, sometimes referred to as a "hydrocarbon"), and having a viscosity at 27° C. of 40 mPa·s or less.

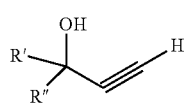

(2)

(In the formula, each of R' and R" independently represents an alkyl group having 1 to 20 carbon atoms or a phenyl group in which one or more hydrogen atoms may be substituted with a substituent.)

[Silver Carboxylate]

The aforementioned silver carboxylate is not particularly limited as long as it has a group represented by the formula "—COOAg". For example, the number of groups represented by the formula "—COOAg" may be only one or may be two or more. In addition, the position of the group represented by the formula "—COOAg" in the silver carboxylate is also not particularly limited.

The above silver carboxylate is decomposed by heating or the like, and therefore metal silver is formed.

In the present invention, a single type of the above silver carboxylate may be used alone, or two or more types thereof may be used in combination. When two or more types are used in combination, the combinations and ratios thereof can be adjusted arbitrarily.

The aforementioned silver carboxylate is preferably a silver β-ketocarboxylate represented by the following general formula (1) (hereinafter, abbreviated as a silver "β-ketocarboxylate" in some cases).

In the present specification, unless otherwise specified, a simple description of "silver carboxylate" refers not only to a "silver β-ketocarboxylate" but also to a "silver carboxylate having a group represented by the formula "—COOAg" which encompasses the former.

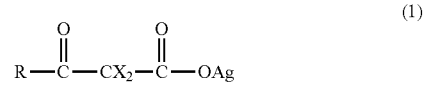

(1)

(In the formula, R represents an aliphatic hydrocarbon group having 1 to 20 carbon atoms in which one or more hydrogen atoms may be substituted with a substituent, or represents a phenyl group, a hydroxyl group, an amino group, or a group represented by general formula "R'—$CY_2$—", "$CY_3$—", "$R^1$—CHY—", "$R^{20}$—", "$R^5R^4N$—", "$(R^3O)_2CY$—", or "$R^6$—C(=O)—$CY_2$—";

each Y independently represents a fluorine atom, a chlorine atom, a bromine atom or a hydrogen atom; $R^1$ represents an aliphatic hydrocarbon group having 1 to 19 carbon atoms or a phenyl group; $R^2$ represents an aliphatic hydrocarbon group having 1 to 20 carbon atoms; $R^3$ represents an aliphatic hydrocarbon group having 1 to 16 carbon atoms; each of $R^4$ and $R^5$ independently represents an aliphatic hydrocarbon group having 1 to 18 carbon atoms; and $R^6$ represents an aliphatic hydrocarbon group having 1 to 19 carbon atoms, a hydroxyl group or a group represented by a formula "AgO—";

each X independently represents a hydrogen atom, an aliphatic hydrocarbon group having 1 to 20 carbon atoms, a halogen atom, a phenyl group or benzyl group in which one or more hydrogen atoms may be substituted with a substituent, a cyano group, an N-phthaloyl-3-aminopropyl group, a 2-ethoxyvinyl group, or a group represented by general formula "$R^7O$—", "R'S—", "$R^7$—C(=O)—" or "$R^7$—C(=O)—O—"; and $R^7$ represents an aliphatic hydrocarbon group having 1 to 10 carbon atoms, a thienyl group, or a phenyl group or diphenyl group in which one or more hydrogen atoms may be substituted with a substituent).

(Silver β-ketocarboxylate)

In the present invention, the aforementioned silver β-ketocarboxylate is represented by the above general formula (1).

In the formula, R represents an aliphatic hydrocarbon group having 1 to 20 carbon atoms in which one or more hydrogen atoms may be substituted with a substituent, or represents a phenyl group, a hydroxyl group, an amino group, or a group represented by general formula "$R^1$—$CY_2$—", "$CY_3$—", "$R^1$—CHY—", "$R^2O$—", "$R^5R^4N$—", "$(R^3O)_2CY$—", or "$R^6$—C(=O)—$CY_2$—".

The aliphatic hydrocarbon group having 1 to 20 carbon atoms for R may be any one of linear, branched and cyclic groups (aliphatic cyclic groups), and in the case of the cyclic groups, may be any one of monocyclic and polycyclic groups. Further, the aforementioned aliphatic hydrocarbon group may be either a saturated aliphatic hydrocarbon group or an unsaturated aliphatic hydrocarbon group. The above aliphatic hydrocarbon group preferably has 1 to 10 carbon atoms, and more preferably 1 to 6 carbon atoms. Preferred examples of the aliphatic hydrocarbon group for R include an alkyl group, an alkenyl group and an alkynyl group.

Examples of the linear or branched alkyl group for R include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a tert-pentyl group, a 1-methylbutyl group, a 2-methylbutyl group, an n-hexyl group, a 1-methylpentyl group, a 2-methylpentyl group, a 3-methylpentyl group, a 4-methylpentyl group, a 1,1-dimethylbutyl group, a 2,2-dimethylbutyl group, a 3,3-dimethylbutyl group, a 2,3-dimethylbutyl group, a 1-ethylbutyl group, a 2-ethylbutyl group, a 3-ethylbutyl group, a 1-ethyl-1-methylpropyl group, an n-heptyl group, a 1-methylhexyl group, a 2-methylhexyl group, a 3-methylhexyl group, a 4-methylhexyl group, a 5-methylhexyl group, a 1,1-dimethylpentyl group, a 2,2-dimethylpentyl group, a 2,3-dimethylpentyl group, a 2,4-dimethylpentyl group, a 3,3-dimethylpentyl group, a 4,4-dimethylpentyl group, a 1-ethylpentyl group, a 2-ethylpentyl group, a 3-ethylpentyl group, a 4-ethylpentyl group, a 2,2,3-trimethylbutyl group, a 1-propylbutyl group, an n-octyl group, an isooctyl group, a 1-methylheptyl group, a 2-methylheptyl group, a 3-methylheptyl group, a 4-methylheptyl group, a 5-methylheptyl group, a 1-ethylhexyl group, a 2-ethylhexyl group, a 3-ethylhexyl group, a 4-ethylhexyl group, a 5-ethylhexyl group, a 1,1-dimethylhexyl group, a 2,2-dimethylhexyl group, a 3,3-dimethylhexyl group, a 4,4-dimethylhexyl group, a 5,5-dimethylhexyl group, a 1-propylpentyl group, a 2-propylpentyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group and an icosyl group.

Examples of the cyclic alkyl group for R include a cyclopropyl group, a cyclobutyl group, a cyclopentyl group, a cyclohexyl group, a cycloheptyl group, a cyclooctyl group, a cyclononyl group, a cyclodecyl group, a norbornyl group, an isobornyl group, a 1-adamantyl group, a 2-adamantyl group and a tricyclodecyl group.

Examples of the alkenyl group for R include a group in which one single bond (C—C) between the carbon atoms of the above alkyl group in R is substituted with a double bond (C=C), such as a vinyl group (ethenyl group, —CH=$CH_2$), an allyl group (2-propenyl group, —$CH_2$—CH=$CH_2$), a 1-propenyl group (—CH=CH—$CH_3$), an isopropenyl group (—C($CH_3$)=$CH_2$), a 1-butenyl group (—CH=CH—$CH_2$—$CH_3$), a 2-butenyl group (—$CH_2$—CH=CH—$CH_3$), a 3-butenyl group (—$CH_2$—$CH_2$—CH=$CH_2$), a cyclohexenyl group and a cyclopentenyl group.

Examples of the alkynyl group for R include a group in which one single bond (C—C) between the carbon atoms of the above alkyl group in R is substituted with a triple bond (C≡C), such as an ethynyl group (—C≡CH) and a propargyl group (—$CH_2$—C≡CH).

In the aliphatic hydrocarbon group having 1 to 20 carbon atoms for R, one or more hydrogen atoms may be substituted with a substituent, and preferred examples of the substituent include a fluorine atom, a chlorine atom and a bromine atom. In addition, the number and position of the substituent are not particularly limited. When the number of the substituent is plural, these plurality of substituents may be the same or different from each other. That is, all substituents may be the same, all substituents may be different, or only a portion of substituents may be different.

In the phenyl group for R, one or more hydrogen atoms may be substituted with a substituent, and preferred examples of the substituent include a saturated or unsaturated monovalent aliphatic hydrocarbon group of 1 to 16 carbon atoms, a monovalent group wherein the above aliphatic hydrocarbon group bonded to an oxygen atom, a fluorine atom, a chlorine atom, a bromine atom, a hydroxyl group (—OH), a cyano group (—C≡N) and a phenoxy group (—O—$C_6H_5$), and the number and position of the substituent are not particularly limited. When the number of the substituent is plural, these plurality of substituents may be the same or different from each other.

Examples of the above aliphatic hydrocarbon group as a substituent include the same aliphatic hydrocarbon groups as those described above for R, with the exception that the number of carbon atoms is from 1 to 16.

Each Y for R independently represents a fluorine atom, a chlorine atom, a bromine atom or a hydrogen atom. In the general formula "$R^1$—$CY_2$—", "$CY_3$—", and "$R^6$—C(=O)—$CY_2$—", each of the plurality of Y may be the same or different from each other.

$R^1$ for R represents an aliphatic hydrocarbon group having 1 to 19 carbon atoms or a phenyl group ($C_6H_5$—), and as the above aliphatic hydrocarbon group for $R^1$, the same aliphatic hydrocarbon groups as those described above for R can be mentioned, with the exception that the number of carbon atoms is from 1 to 19.

$R^2$ for R represents an aliphatic hydrocarbon group having 1 to 20 carbon atoms, and the same aliphatic hydrocarbon groups as those described above for R can be mentioned.

$R^3$ for R represents an aliphatic hydrocarbon group having 1 to 16 carbon atoms, and the same aliphatic hydrocarbon groups as those described above for R can be mentioned, with the exception that the number of carbon atoms is from 1 to 16.

Each of $R^4$ and $R^5$ for R independently represents an aliphatic hydrocarbon group having 1 to 18 carbon atoms. That is, $R^4$ and $R^5$ may be the same or different from each other, and the same aliphatic hydrocarbon groups as those described above for R can be mentioned, with the exception that the number of carbon atoms is from 1 to 18.

$R^6$ for R represents an aliphatic hydrocarbon group having 1 to 19 carbon atoms, a hydroxyl group or a group represented by a formula "AgO—", and as the above aliphatic hydrocarbon group for $R^6$, the same aliphatic hydrocarbon groups as those described above for R can be mentioned, with the exception that the number of carbon atoms is from 1 to 19.

Among those described above, R is preferably a linear or branched alkyl group, a phenyl group, or a group represented by a formula "$R^6$—C(=O)—$CY_2$—". $R^6$ is preferably a linear or branched alkyl group, a hydroxyl group or a group represented by the formula "AgO—".

In the general formula (1), each X independently represents a hydrogen atom, an aliphatic hydrocarbon group having 1 to 20 carbon atoms, a halogen atom, a phenyl group or benzyl group ($C_6H_5$—$CH_2$—) in which one or more hydrogen atoms may be substituted with a substituent, a cyano group, an N-phthaloyl-3-aminopropyl group, a 2-ethoxyvinyl group ($C_2H_5$—O—CH=CH—), or a group represented by general formula "$R^7$O—", "$R^7$S—", "$R^7$—C(=O)—" or "$R^7$—C(=O)—O—".

As the aliphatic hydrocarbon group having 1 to 20 carbon atoms for X, the same aliphatic hydrocarbon groups as those described above for R can be mentioned.

Examples of the halogen atom for X include a fluorine atom, a chlorine atom, a bromine atom, and an iodine atom.

The phenyl group or benzyl group for X may have one or more hydrogen atoms substituted with a substituent, and preferred examples of the above substituent include a halogen atom (a fluorine atom, a chlorine atom, a bromine atom and an iodine atom) and a nitro group (—$NO_2$), and the number and position of the substituent are not particularly limited. When the number of the substituent is plural, these plurality of substituents may be the same or different from each other.

$R^7$ for X is an aliphatic hydrocarbon group having 1 to 10 carbon atoms, a thienyl group ($C_4H_3S$—), or a phenyl group or diphenyl group (biphenyl group, $C_6H_5$—$C_6H_4$—) in which one or more hydrogen atoms may be substituted with a substituent. As the above aliphatic hydrocarbon group for $R^7$, the same aliphatic hydrocarbon groups as those described above for R can be mentioned, with the exception that the number of carbon atoms is from 1 to 10. Further, examples of the above substituent of the phenyl group and diphenyl group for $R^7$ include a halogen atom (a fluorine atom, a chlorine atom, a bromine atom and an iodine atom), and the number and position of the substituent are not particularly limited. When the number of the substituent is plural, these plurality of substituents may be the same or different from each other.

When $R^7$ is a thienyl group or a diphenyl group, the bonding position thereof with the adjacent groups or atoms in X (an oxygen atom, a sulfur atom, a carbonyl group or a carbonyloxy group) is not particularly limited. For example, the thienyl group may be either a 2-thienyl group or a 3-thienyl group.

In the general formula (1), two X may be bonded as one group through a double bond with a carbon atom sandwiched between two carbonyl groups, and examples of such groups include a group represented by a formula "=CH—$C_6H_4$—$NO_2$".

Among those described above, X is preferably a hydrogen atom, a linear or branched alkyl group, or a benzyl group, and it is preferable that at least one X be a hydrogen atom.

The aforementioned silver β-ketocarboxylate is preferably silver 2-methylacetoacetate ($CH_3$—C(=O)—CH($CH_3$)—C(=O)—OAg), silver acetoacetate ($CH_3$—C(=O)—$CH_2$—C(=O)—OAg), silver 2-ethylacetoacetate ($CH_3$—C(=O)—CH($CH_2CH_3$)—C(=O)—OAg), silver propionyl acetate ($CH_3CH_2$—C(=O)—$CH_2$—C(=O)—OAg), silver isobutyrylacetate (($CH_3$)$_2$CH—C(=O)—$CH_2$—C(=O)—OAg), silver pivaloylacetate (($CH_3$)$_3$C—C(=O)—$CH_2$—C(=O)—OAg), silver 2-n-butyl acetoacetate ($CH_3$—C(=O)—CH($CH_2CH_2CH_2CH_3$)—C(=O)—OAg), silver 2-benzylacetoacetate ($CH_3$—C(=O)—CH($CH_2C_6H_5$)—C(=O)—OAg), silver benzoylacetate ($C_6H_5$—C(=O)—$CH_2$—C(=O)—OAg), silver pivaloylacetoacetate (($CH_3$)$_3$C—C(=O)—$CH_2$—C(=O)—$CH_2$—C(=O)—OAg), silver isobutyrylacetoacetate (($CH_3$)$_2$CH—C(=O)—$CH_2$—C(=O)—$CH_2$—C(=O)—OAg) or silver acetonedicarboxylate (AgO—C(=O)—$CH_2$—C(=O)—$CH_2$—C(=O)—OAg). Among those represented by the general formula (1), these silver β-ketocarboxylates are capable of further reducing the concentration of the remaining raw materials and impurities in the metal silver formed by a heating (firing) treatment. The lower the concentration of the raw materials and impurities, for example, the more the metal-to-metal contact between the metal silver formed is improved, the conduction is facilitated and the resistivity is reduced.

As described below, the aforementioned silver β-ketocarboxylate preferably decomposes at a low temperature of 60 to 210° C., and more preferably from 60 to 200° C., to form metal silver, even without using a reducing agent or the like which is known in the art.

In the present invention, a single type of silver β-ketocarboxylate may be used alone, or two or more types thereof may be used in combination. When two or more types are used in combination, the combinations and ratios thereof can be adjusted arbitrarily.

In the silver ink composition, the content of silver in the silver carboxylate is preferably at least 17% by mass, and more preferably 18% by mass or more. By ensuring that the content of silver is within such a range, in the metal silver formed in a manner to be described later, the conductivity becomes favorable while the quality is further improved. The upper limit for the aforementioned silver content is not particularly limited, as long as it does not interfere with the effects of the present invention, but is preferably 25% by mass in consideration of the handling properties and the like.

[Amine Compound]

In the present invention, the aforementioned amine compound is an aliphatic primary amine or an aliphatic secondary amine and is not particularly limited as long as the total number of carbon atoms is from 2 to 10. Preferred examples thereof include those in which the aliphatic hydrocarbon group bonded to a nitrogen atom is an alkyl group (alkylamines and dialkylamines). The above alkyl group may be any of linear, branched or cyclic.

Examples of the linear or branched alkyl group include an ethyl group, an n-propyl group, an isopropyl group, an n-butyl group, an isobutyl group, a sec-butyl group, a tert-butyl group, an n-pentyl group, an isopentyl group, a neopentyl group, an n-hexyl group, a 2-methylpentyl group, a 3-methylpentyl group, a 4-methylpentyl group, a 1,1-dimethylbutyl group, a 2,2-dimethylbutyl group, a 3,3-dimethylbutyl group, a 1,2-dimethylbutyl group, a 1,3-dimethylbutyl group, a 2,3-dimethylbutyl group, an n-heptyl group, an n-octyl group, a 2-ethylhexyl group, a nonyl group and a decyl group.

The above cyclic alkyl group may be either monocyclic or polycyclic, and examples thereof include a cyclopropyl group, a cyclobutyl group, a cyclopentyl group, a cyclohexyl group, a cycloheptyl group, a cyclooctyl group, a cyclononyl group, a cyclodecyl group, a norbornyl group, an isobornyl group, an adamantyl group and a tricyclodecyl group.

Among them, the aforementioned amine compound is preferably those in which the alkyl group bonded to a nitrogen atom is linear or branched. The above amine is preferably one having 2 to 9 carbon atoms and more preferably 3 to 8 carbon atoms, and specific examples thereof include n-propylamine, n-butylamine, n-pentylamine, n-hexylamine, n-heptylamine, 2-ethylhexylamine, n-octylamine, N-methylhexylamine and N-ethylhexylamine.

A single type of the above amine compound may be used alone, or two or more types thereof may be used in combination. When two or more types are used in combination, the combinations and ratios thereof may be selected appropriately depending on the purpose.

In the silver ink composition, the added amount of the aforementioned amine compound is preferably from 1 to 6 moles and more preferably from 1.5 to 5 moles, per one mole of the added amount of the aforementioned silver carboxylate. By ensuring that the amount of the amine compound is equal to or more than the lower limit, the effect of using the amine compound is further enhanced, and by ensuring that the amount of the amine compound is not greater than the upper limit, it is possible to form a metal silver with even better quality.

[Acetylene Alcohols]

In the present invention, acetylene alcohols are represented by the aforementioned general formula (2).

In the general formula (2), each of R' and R" independently represents an alkyl group having 1 to 20 carbon atoms or a phenyl group in which one or more hydrogen atoms may be substituted with a substituent.

The alkyl group having 1 to 20 carbon atoms for R' and R" may be any one of linear, branched and cyclic groups (aliphatic cyclic groups), and in the case of the cyclic groups, may be any one of monocyclic and polycyclic groups. As the aforementioned alkyl group for R' and R", the same alkyl groups as those described above for R can be mentioned.

As the aforementioned substituent with which the hydrogen atoms of the phenyl group for R' and R" may be substituted, a saturated or unsaturated monovalent aliphatic hydrocarbon group having 1 to 16 carbon atoms, a monovalent group in which the above aliphatic hydrocarbon group is bonded to an oxygen atom, a fluorine atom, a chlorine atom, a bromine atom, a hydroxyl group, a cyano group, a phenoxy group, or the like can be mentioned, which are the same substituents as those described above with which the hydrogen atoms of the phenyl group for R may be substituted. The number and position of the substituent are not particularly limited, and when the number of substituent is plural, these plurality of substituents may be the same or different from each other.

R' and R" preferably represent an alkyl group having 1 to 20 carbon atoms, and more preferably a linear or branched alkyl group having 1 to 10 carbon atoms.

Preferred examples of the acetylene alcohols include 3,5-dimethyl-1-hexyn-3-ol, 3-methyl-1-butyn-3-ol and 3-methyl-1-pentyn-3-ol.

In the present invention, a single type of acetylene alcohol may be used alone, or two or more types thereof may be used in combination. When two or more types are used in combination, the combinations and ratios thereof can be adjusted arbitrarily.

In the silver ink composition, the added amount of the acetylene alcohols is preferably from 0.03 to 0.7 moles and more preferably from 0.06 to 0.3 moles, per one mole of the added amount of the aforementioned silver carboxylate. By ensuring that the amount of the acetylene alcohols is equal to or more than the lower limit, the effect of using the acetylene alcohols is further enhanced, and by ensuring that the amount of the acetylene alcohols is not greater than the upper limit, it is possible to form a metal silver with even better quality.

(Hydrocarbon)

In the present invention, the aforementioned hydrocarbon has 6 to 20 carbon atoms, may be any of linear, branched or cyclic, and may be either a saturated hydrocarbon or an unsaturated hydrocarbon. The hydrocarbon is preferably one that is in a liquid form at 15 to 37° C., and more preferably one that is in a liquid form at 15 to 30° C.

Examples of the linear or branched saturated hydrocarbon include n-hexane, 2-methylpentane, 3-methylpentane, 2,2-dimethylbutane, 2,3-dimethylbutane, n-heptane, 2-methylhexane, 3-methylhexane, 2,2-dimethylpentane, 2,3-dimethylpentane, 2,4-dimethylpentane, 3,3-dimethylpentane, 3-ethylpentane, 2,2,3-trimethylbutane, n-octane, 2-methylheptane, 3-methylheptane, 4-methylheptane, 2,2-dimethylhexane, 2,3-dimethylhexane, 2,4-dimethylhexane, 2,5-dimethylhexane, 3,3-dimethylhexane, 3,4-dimethylhexane, 2,2,3-trimethylpentane, 2,2,4-trimethylpentane (isooctane), 2,3,3-trimethylpentane, 2,3,4-trimethylpentane, 3-ethyl-2-methylpentane, 3-ethyl-3-methylpentane, 2,2,3,3-tetramethylbutane, n-nonane, 2-methyloctane, 3-methyloctane, 4-methyloctane, 2,2-dimethylheptane, 2,3-dimethylheptane, 2,4-dimethylheptane, 2,5-dimethylheptane, 2,6-dimethylheptane, 3,3-dimethylheptane, 3,4-dimethylheptane, 3,5-dimethylheptane, 4,4-dimethylheptane, 2,2,4,4-tetramethylpentane, decane, undecane, dodecane, tridecane, tetradecane, pentadecane, hexadecane, heptadecane, octadecane, nonadecane, and eicosane.

The cyclic saturated hydrocarbon may be any of monocyclic or polycyclic, but is preferably monocyclic and more preferably has 8 or less carbon atoms, and examples thereof include cyclohexane, cycloheptane and cyclooctane.

Examples of the unsaturated hydrocarbon include those in which one or more single bonds (C—C) between the carbon atoms of the aforementioned saturated hydrocarbon are substituted with an unsaturated bond (double bond (C=C), triple bond (C≡C)).

The aforementioned unsaturated hydrocarbon may have only either one of, or both of, the double bonds and the triple bonds, as the unsaturated bond between the carbon atoms, and the number and position of the unsaturated bond are not particularly limited, but the number of the unsaturated bond is preferably 1 or 2. Further, in the case of having a double bond as the above unsaturated bond, the aforementioned unsaturated hydrocarbon may be either in a cis-form or in a trans-form.

The unsaturated hydrocarbon is preferably an alkene or an alkyne.

In the present invention, a single type of the above hydrocarbon may be used alone, or two or more types thereof may be used in combination. When two or more types are used in combination, the combinations and ratios thereof can be adjusted arbitrarily.

In the silver ink composition, the added amount of the hydrocarbon is preferably from 0.05 to 2 moles and more preferably from 0.1 to 1.5 moles, per one mole of the added amount of the aforementioned silver carboxylate. By ensuring that the amount of the hydrocarbon is equal to or more than the lower limit, the viscosity of the silver ink composition can be adjusted to low values that are more suitable, and by ensuring that the amount of the hydrocarbon is not greater than the upper limit, it is possible to form a metal silver with even better quality.

[Other Components]

The silver ink composition may also be formed by further blending, other than the aforementioned silver carboxylates, amine compounds, acetylene alcohols and hydrocarbons, other components that do not fall under the above materials within a range that does not impair the effects of the present invention.

In the silver ink composition, the total added amount of the aforementioned silver carboxylates, amine compounds, acetylene alcohols and hydrocarbons, with respect to the total amount of the entire components, is preferably at least 85% by mass, more preferably 90% by mass or more, particularly preferably 95% by mass or more, and may even be 100% by mass.

[Viscosity of Silver Ink Composition]

The silver ink composition has a viscosity at 27° C. of 40 mPa·s or less, preferably 37 mPa·s or less, and more preferably 33 mPa·s or less. By ensuring that the viscosity is not greater than the upper limit, the silver ink composition will have physical properties suitable for the ink jet printing method.

In addition, the lower limit of the viscosity is not particularly limited, but is preferably 5 mPa·s, in consideration of the handling properties of the silver ink composition and the like.

The viscosity of the silver ink composition can be measured in accordance with known methods, and, for example, can be measured by an ultrasonic viscometer.

For example, the viscosity of the silver ink composition can be adjusted by the type and amount of the components thereof, but, in particular, can easily be adjusted by the type of the aforementioned hydrocarbon.

Although the viscosity of the silver ink composition at 27° C. has been described here, the temperature of the silver ink composition at the time of use is not limited to 27° C. and can be selected arbitrarily. By ensuring that the viscosity at 27° C. is within the range as described above, the silver ink composition exhibits excellent effects under normal conditions of use.

[Surface Tension of Silver Ink Composition]

The silver ink composition has a dynamic surface tension at 27° C. of 56 mN/m or less, and preferably 53 mN/m or less, and by ensuring that the dynamic surface tension is within such a range, the silver ink composition will have physical properties suitable for the ink jet printing method.

The lower limit of the dynamic surface tension is not particularly limited, but is preferably 28 mN/m, in consideration of the handling properties of the silver ink composition and the like.

In the present invention, a "dynamic surface tension" can be determined, for example, by the so-called "maximum bubble pressure method" through calculation using the maximum value of the pressure the bubbles receive from the silver ink composition when bubbles are generated in the silver ink composition. In the maximum bubble pressure method, for example, the dynamic surface tension may be determined in any of the cases where the bubble frequency is from 9 to 11 Hz.

Further, the silver ink composition preferably has a static surface tension at 27° C. of 30 mN/m or less, and more preferably 28 mN/m or less. By ensuring that the static surface tension is within such a range, the silver ink composition has physical properties suitable for the ink jet printing method.

The lower limit of the static surface tension is not particularly limited, but is preferably 14 mN/m, in consideration of the handling properties of the silver ink composition and the like.

In the present invention, for example, in the aforementioned maximum bubble pressure method, a surface tension in any of the cases where the bubble frequency is from 0.05 to 0.2 Hz may be defined as a "static surface tension".

In addition, the silver ink composition preferably has a surface tension at 27° C., in the aforementioned maximum bubble pressure method at a bubble frequency of 1 Hz, of 45 mN/m or less, and more preferably 40 mN/m or less. By ensuring that the surface tension is within such a range, the silver ink composition has physical properties suitable for the ink jet printing method.

The lower limit of the aforementioned surface tension at 1 Hz is not particularly limited, but is preferably 21 mN/m, in consideration of the handling properties of the silver ink composition and the like.

The surface tensions (the dynamic surface tension, static surface tension, or the like) of the silver ink composition can be adjusted, for example, by the type and amount of added components, but, in particular, can easily be adjusted by the type of the aforementioned hydrocarbon.

It should be noted that although the surface tension of the silver ink composition at 27° C. has been described here, the temperature of the silver ink composition at the time of use is not limited to 27° C. and can be selected arbitrarily. By ensuring that the surface tension at 27° C. is within the range as described above, the silver ink composition exhibits excellent effects under normal conditions of use.

[Production of Silver Ink Composition]

The silver ink composition is obtained by blending the aforementioned silver carboxylate, amine compound, acetylene alcohol and hydrocarbon, as well as the aforementioned other components if necessary.

At the time of blending each of the components, mixing may be carried out after adding all components, may be carried out while sequentially adding some components, or may even be carried out while sequentially adding all components.

The mixing method is not particularly limited, and may be appropriately selected from known methods, such as a method of mixing by rotating a stirring bar, a stirring blade, or the like, a method of mixing using a mixer, and a method of mixing by applying ultrasonic waves.

The added components may be completely dissolved in the silver ink composition, or may also be in a state in which a part of the components are dispersed without being dissolved.

The temperature at the time of blending is not particularly limited as long as the components do not deteriorate, but is preferably from −5 to 30° C.

[Metal Silver]

The silver ink composition of the present invention is capable of forming metal silver with ease, for example, by heating (firing) the composition at a temperature of 60 to 200° C., to thereby thermally decompose the silver carboxylate. Therefore, by applying the silver ink composition to various printing methods suited for the viscosity thereof, such as the ink jet printing method, and heat-treating the resulting printing pattern, it is possible to form a pattern of metal silver.

The heating temperature during the formation of metal silver may be adjusted appropriately, depending on the type of silver carboxylates. Silver carboxylate preferably decomposes at a low temperature of, for example, 60 to 210° C., and more preferably from 60 to 200° C., to form metal silver. Therefore, reflecting such decomposition temperatures, the silver ink composition of the present invention is capable of forming metal silver at a temperature lower than that required by the conventional metal silver forming materials as described above, without using a reducing agent or the like which is known in the art. The heating time may be adjusted appropriately, depending on the heating temperature.

An object to be printed by the ink jet printing with the silver ink composition may be a known material, and examples thereof include, but not limited to, one in which an ink receiving layer is provided on a substrate.

The material of the substrate is not particularly limited, and may be selected depending on the purpose. Specific examples thereof include papers, such as base paper, art paper, coated paper, cast-coated paper, resin-coated paper and synthetic paper; and synthetic resins, such as polyethylene, polypropylene, polyvinyl chloride, polystyrene, polyvinyl acetate, acrylic resins, AS resins, ABS resins, polyamides, polyacetal, polyethylene terephthalate, polybutylene terephthalate, polytrimethylene terephthalate, polyethylene naphthalate, polybutylene naphthalate, polyphenylene sulfide, polysulfone, polycarbonate, epoxy resins, melamine resins, phenol resins, urea resins, polyurethanes and polyimides. Further, it may be one made of two or more types of materials that are laminated.

The aforementioned base material preferably has a sheet-like or film-like shape, and preferably has a thickness of 20 to 1,000 μm. By ensuring that the thickness of the substrate is equal to or more than the lower limit, the structure of the ink receiving layer can be maintained in a more stable manner, and by ensuring that the thickness is not greater than the upper limit, the handling properties as the object to be printed can be further improved.

The ink receiving layer preferably has a thickness of 1 to 20 μm. By ensuring that the thickness of the ink receiving layer is within such a range, it is possible to maintain the structure of the ink receiving layer more stably and also to further improve the quality of the printed material.

Because the viscosity is within the numerical range described above, the silver ink composition of the present invention is suitable for application to ink jet printing methods. The silver ink composition can be produced in an extremely simple manner by simply blending the components at a predetermined temperature. Moreover, the thus obtained silver ink composition can form a practical amount of metal silver extremely easily by being heated as it is, without using the aforementioned reducing agent and the like.

It should be noted that in the present invention, the terms "plural" and "plurality" mean any number of 2 or greater.

EXAMPLES

The present invention will be described in further detail below by means of specific examples. However, the present invention is in no way limited to the examples presented below.

Production and Evaluation of Silver Ink Composition

Example 1

Production of Silver Ink Composition 3.1 g of 2-ethylhexylamine, 0.17 g of 3,5-dimethyl-1-hexyn-3-ol ("Surfynol 61" manufactured by Air Products Japan, Inc.) and 0.8 g of n-octane were added to and stirred in a 13.5-mL vial container, and 3.0 g of silver 2-methylacetoacetate was further added thereto under ice cooling and stirred for 30 minutes, thereby obtaining a silver ink composition. The added amount of each component is shown in Table 1.

(Evaluation of Silver Ink Composition)
—Viscosity

A sensor (vibrator) of an ultrasonic viscometer ("VISCOMATE VM-10A" manufactured by CBC Co., Ltd.) was immersed in 7 g of the thus obtained silver ink composition, and the viscosity of the silver ink composition was measured in an environment at a temperature of 27° C. The results are shown in Table 2.

—Surface Tension

A sensor of a surface tension meter ("Portable surface tensiometer SITA t60" manufactured by EKO Instruments Co., Ltd.) was immersed in 7 g of the thus obtained silver ink composition, and in an environment at a temperature of 27° C., while altering the bubble frequency from 0 Hz to 10 Hz, the surface tension of the silver ink composition in the case of 0.1 Hz (static surface tension), the surface tension thereof in the case of 1 Hz, and the surface tension thereof in the case of 10 Hz (dynamic surface tension) were measured by the maximum bubble pressure method, respectively. The results are shown in Table 2.

<Production and Evaluation of Metal Silver>
(Production of Metal Silver)

The silver ink composition obtained as described above was ejected and applied onto a substrate made of polyethylene terephthalate (PET) ("Lumirror S10" manufactured by Toray Industries, Inc. having a thickness of 100 μm). The amount of the silver ink composition applied onto the substrate at this time was adjusted to be 15±1 g/m$^2$.

Then, the silver ink composition was subjected to a heat treatment for 30 minutes at 80° C. by blowing hot air, and was sequentially subjected to a further heat treatment, either for 30 minutes or for 60 minutes, at 150° C. by blowing hot air, in order to form a metal silver in two ways.

(Evaluation of Metal Silver)

In the thus obtained metal silver, a surface resistance value (Ω/□) was measured, in accordance with JIS K 7194 (ASTM D 991), by using an electrical resistance measuring device "Loresta MCP-T610 (manufactured by Mitsubishi Chemical Analytech Co., Ltd.)". The results are shown in Table 2.

Production and Evaluation of Silver Ink Composition, and Production and Evaluation of Metal Silver Examples 2 to 17, Comparative Examples 1 to 3

Silver ink compositions were produced and evaluated in the same manner as in Example 1 with the exception that the amount and type of each component were as shown in Table 1. The results are shown in Table 2. In Table 1, the symbol indicates that the component was not added.

Further, by using the thus obtained silver ink compositions, metal silvers were produced and evaluated in the same manner as in Example 1. The results are shown in Table 2. In Table 2, the abbreviation "OL" indicates that the value was too large and could not be measured (overloaded).

The abbreviations shown in Table 1 indicate the following.
(a) Silver carboxylate
(a)-1: Silver 2-methylacetoacetate
(b) Amine compound
(b)-1: 2-ethylhexylamine
(c) Acetylene alcohol
(c)-1: 3,5-dimethyl-1-hexyn-3-ol
(c)-2: 3-methyl-1-pentyn-3-ol ("OLFINE P" manufactured by Nissin Chemical Industry Co., Ltd.)
(c)-3: 3-methyl-1-butyn-3-ol ("OLFINE B" manufactured by Nissin Chemical Industry Co., Ltd.)

TABLE 1

| | Components (mmol) | | | |
|---|---|---|---|---|
| | (a) Silver carboxylate | (b) Amine compound | (c) Acetylene alcohol | (d) Hydrocarbon |
| Ex. 1 | (a)-1 (13.5) | (b)-1 (24.0) | (c)-1 (1.3) | n-octane (7.0) |
| Ex. 2 | (a)-1 (13.5) | (b)-1 (24.0) | (c)-2 (1.7) | n-octane (7.0) |
| Ex. 3 | (a)-1 (13.5) | (b)-1 (24.0) | (c)-3 (2.0) | n-octane (7.0) |
| Ex. 4 | (a)-1 (13.5) | (b)-1 (24.0) | (c)-1 (1.3) | n-hexane (9.3) |
| Ex. 5 | (a)-1 (13.5) | (b)-1 (24.0) | (c)-1 (1.3) | decane (5.6) |

TABLE 1-continued

| | Components (mmol) | | | |
|---|---|---|---|---|
| | (a) Silver carboxylate | (b) Amine compound | (c) Acetylene alcohol | (d) Hydrocarbon |
| Ex. 6 | (a)-1 (13.5) | (b)-1 (24.0) | (c)-1 (1.3) | dodecane (4.7) |
| Ex. 7 | (a)-1 (13.5) | (b)-1 (24.0) | (c)-1 (1.3) | tetradecane (4.0) |
| Ex. 8 | (a)-1 (13.5) | (b)-1 (24.0) | (c)-1 (1.3) | hexadecane (3.5) |
| Ex. 9 | (a)-1 (13.5) | (b)-1 (24.0) | (c)-1 (1.3) | eicosane (2.8) |
| Ex. 10 | (a)-1 (13.5) | (b)-1 (24.0) | (c)-1 (1.3) | cyclohexane (9.5) |
| Ex. 11 | (a)-1 (13.5) | (b)-1 (24.0) | (c)-1 (1.3) | cyclooctane (7.1) |
| Ex. 12 | (a)-1 (13.5) | (b)-1 (24.0) | (c)-1 (1.3) | 2-methyloctane (6.2) |
| Ex. 13 | (a)-1 (13.5) | (b)-1 (24.0) | (c)-1 (1.3) | 2,2,4,4-tetramethylpentane (6.2) |
| Ex. 14 | (a)-1 (13.5) | (b)-1 (24.0) | (c)-1 (1.3) | 1-octene (7.1) |
| Ex. 15 | (a)-1 (13.5) | (b)-1 (24.0) | (c)-1 (1.3) | trans-4-octene (7.1) |
| Ex. 16 | (a)-1 (13.5) | (b)-1 (24.0) | (c)-1 (1.3) | cis-4-octene (7.1) |
| Ex. 17 | (a)-1 (13.5) | (b)-1 (24.0) | (c)-1 (1.3) | 4-octyne (7.3) |
| Comp. Ex. 1 | (a)-1 (13.5) | (b)-1 (30.0) | (c)-1 (1.3) | — |
| Comp. Ex. 2 | (a)-1 (13.5) | (b)-1 (24.0) | (c)-1 (1.3) | 1-octyne (7.3) |
| Comp. Ex. 3 | (a)-1 (7.9) | (b)-1 (40.8) | (c)-1 (0.6) | — |

TABLE 2

| | Viscosity of silver ink composition (mPa·s) | Surface tension of silver ink composition (mN/m) | | Resistance of metal silver (Ω/□) | |
|---|---|---|---|---|---|
| | | 0.1 Hz 1 Hz (Static) | 10 Hz (Dynamic) | 150° C., 30 minutes | 150° C., 60 minutes |
| Ex. 1 | 12 | 23.0 27.7 | 45.2 | 0.2 | 0.2 |
| Ex. 2 | 12 | 23.0 28.2 | 45.4 | 0.3 | 0.3 |
| Ex. 3 | 12 | 23.0 28.2 | 45.5 | 0.4 | 0.3 |
| Ex. 4 | 9 | 21.9 27.0 | 49.2 | 0.3 | 0.3 |
| Ex. 5 | 14 | 23.9 29.8 | 46.5 | 0.2 | 0.2 |
| Ex. 6 | 16 | 24.5 30.6 | 48.5 | 0.2 | 0.2 |
| Ex. 7 | 18 | 24.8 32.1 | 49.9 | 0.2 | 0.2 |
| Ex. 8 | 22 | 26.9 45.3 | 58.2 | 0.4 | 0.3 |
| Ex. 9 | 31 | — — | — | 0.3 | 0.3 |
| Ex. 10 | 16 | 24.3 33.9 | 46.3 | 0.2 | 0.2 |
| Ex. 11 | 20 | 25.5 35.7 | 51.9 | 0.2 | 0.2 |
| Ex. 12 | 13 | 23.6 29.4 | 45.3 | 0.2 | 0.2 |
| Ex. 13 | 16 | 22.8 30.9 | 48.8 | 0.2 | 0.2 |
| Ex. 14 | 11 | 23.3 28.0 | 45.8 | 0.2 | 0.2 |
| Ex. 15 | 12 | 23.6 28.1 | 46.4 | 0.2 | 0.2 |
| Ex. 16 | 12 | 23.9 29.4 | 47.2 | 0.2 | 0.2 |
| Ex. 17 | 13 | 24.2 30.8 | 46.9 | 0.2 | 0.2 |
| Comp. Ex. 1 | 46 | 26.8 45.6 | 58.4 | 0.3 | 0.3 |
| Comp. Ex. 2 | 65 | 28.9 49.7 | 65.1 | OL | OL |
| Comp. Ex. 3 | 10 | 25.5 29.8 | 45.7 | 0.6 | 0.6 |

As is apparent from the above results, it was confirmed that the silver ink composition of the present invention had a viscosity of 31 mPa·s or less and could be ejected easily, and was therefore suitable for application to ink jet printing methods. In addition, metal silver was formed in a sufficient amount and was suitable as a conductive material, since the resistance value thereof was as low as 0.4Ω/□ or less and was stable even when the time of the heat treatment was altered.

On the other hand, because the hydrocarbon was not added, the silver ink composition of Comparative Example 1 had high viscosity and was difficult to eject, and was therefore not suitable for application to ink jet printing methods.

Further, because the type of hydrocarbon added was not suitable, the silver ink composition of Comparative Example 2 had high viscosity and was difficult to eject, and was therefore not suitable for application to ink jet printing methods. Furthermore, the thus formed metal silver exhibited a significantly high resistance value, which was impossible to measure.

In addition, in the silver ink composition of Comparative Example 3 which was prepared in a manner such that no hydrocarbon was added and the amount of silver carboxylate was reduced while the amount of amine compound was increased, as compared with that of Comparative Example 1, although the viscosity was low, the formed metal silver had a high resistance value.

Production and Evaluation of Silver Ink Composition, and Production and Evaluation of Metal Silver Examples 18 to 23

Silver ink compositions were produced and evaluated in the same manner as in Example 1 with the exception that the amount and type of each component were as shown in Table 3. The results are shown in Table 4.

Further, by using the thus obtained silver ink compositions, metal silvers were produced and evaluated in the same manner as in Example 1. The results are shown in Table 4.

The abbreviations shown in Table 3 indicate the following.
(a) Silver carboxylate
(a)-2: Silver acetoacetate
(a)-3: Silver pivaloylacetate
(a)-4: Silver isobutyrylacetate
(a)-5: silver acetonedicarboxylate

TABLE 3

| | Components (mmol) | | | |
|---|---|---|---|---|
| | (A) Silver carboxylate | (b) Amine compound | (c) Acetylene alcohol | (d) Hydrocarbon |
| Ex. 18 | (a)-2 (14.3) | (b)-1 (24.0) | (c)-1 (1.3) | n-octane (7.0) |
| Ex. 19 | (a)-2 (13.5) | (b)-1 (24.0) | (c)-1 (1.3) | n-octane (7.0) |
| Ex. 20 | (a)-3 (12.0) | (b)-1 (24.0) | (c)-1 (1.3) | n-octane (7.0) |
| Ex. 21 | (a)-3 (13.5) | (b)-1 (24.0) | (c)-1 (1.3) | n-octane (7.0) |
| Ex. 22 | (a)-4 (12.7) | (b)-1 (24.0) | (c)-1 (1.3) | n-octane (7.0) |
| Ex. 23 | (a)-5 (5.6) | (b)-1 (24.0) | (c)-1 (1.3) | n-octane (7.0) |

TABLE 4

| | Viscosity of silver ink composition (mPa·s) | Surface tension of silver ink composition (mN/m) | | Resistance of metal silver (Ω/□) | |
|---|---|---|---|---|---|
| | | 0.1 Hz 1 Hz (Static) | 10 Hz (Dynamic) | 150° C., 30 minutes | 150° C., 60 minutes |
| Ex. 18 | 19.1 | 24.0 30.6 | 47.1 | 0.2 | 0.2 |
| Ex. 19 | 16.3 | 23.5 28.4 | 43.4 | 0.1 | 0.1 |
| Ex. 20 | 16.1 | 23.0 27.0 | 42.9 | 5.2 | 5.0 |
| Ex. 21 | 18.0 | 22.9 28.1 | 44.7 | 4.0 | 3.9 |
| Ex. 22 | 10.5 | 23.1 26.5 | 42.7 | 0.4 | 0.4 |
| Ex. 23 | 25.6 | 24.5 33.4 | 50.2 | 3.9 | 0.2 |

As is apparent from the above results, it was confirmed that the silver ink composition of the present invention had a viscosity of 25.6 mPa·s or less and could be ejected easily, and was therefore suitable for application to ink jet printing methods. In addition, metal silver was formed in a sufficient amount and was suitable as a conductive material, since the resistance value thereof was as low as 5.2Ω/□ or less and was stable even when the time of the heat treatment was altered.

INDUSTRIAL APPLICABILITY

The present invention can be used as an ink for ink jet printing, and is particularly useful for forming a fine pattern of metal silver.

The invention claimed is:
1. A silver ink composition comprising:
a silver carboxylate having a group represented by a formula —COOAg;
an aliphatic primary amine or secondary amine having 2 to 10 carbon atoms;
an acetylene alcohol represented by a general formula (2) shown below; and
a hydrocarbon having 6 to 20 carbon atoms which is at least one selected from the group consisting of a linear or branched saturated hydrocarbon having 10 to 20 carbon atoms, a cyclic saturated hydrocarbon having 6 to 20 carbon atoms, an alkene having 6 to 20 carbon atoms and an alkyne having 6 to 20 carbon atoms;
wherein a viscosity at 27° C. of the composition is 40 mPa·s or less,

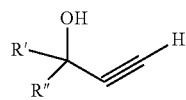

(2)

wherein each of R' and R" independently represents an alkyl group having 1 to 20 carbon atoms or a phenyl group in which one or more hydrogen atoms may be substituted with a substituent.

2. The silver ink composition according to claim 1, wherein the linear or branched saturated hydrocarbon having 10 to 20 carbon atoms is at least one selected from the group consisting of decane, undecane, dodecane, tridecane, tetradecane, pentadecane, hexadecane, heptadecane, octadecane, nonadecane and eicosane.

3. The silver ink composition according to claim 1, wherein the cyclic saturated hydrocarbon having 6 to 20 carbon atoms is at least one selected from the group consisting of cyclohexane, cycloheptane and cyclooctane.

4. The silver ink composition according to claim 1, wherein the alkene having 6 to 20 carbon atoms is at least one selected from the group consisting of 1-octene, trans-4-octene and cis-4-octene.

5. The silver ink composition according to claim 1, wherein the alkene having 6 to 20 carbon atoms is 4-octyne.

6. The silver ink composition according to claim 1, wherein the linear or branched saturated hydrocarbon having 10 to 20 carbon atoms is at least one selected from the group consisting of decane, dodecane, tetradecane, hexadecane and eicosane.

7. The silver ink composition according to claim 1, wherein the cyclic saturated having 6 to 20 carbon atoms is one of or both of cyclohexane and cyclooctane.

8. The silver ink composition according to claim 1, wherein a dynamic surface tension at 27° C. thereof is 56 mN/m or less.

9. The silver ink composition according to claim 1, wherein said silver carboxylate is a silver β-ketocarboxylate represented by the following general formula (1),

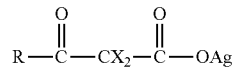

(1)

wherein R represents an aliphatic hydrocarbon group having 1 to 20 carbon atoms in which one or more hydrogen atoms may be substituted with a substituent, a phenyl group, a hydroxyl group, an amino group, or a group represented by general formula $R^1$—$CY_2$—, $CY_3$—, $R^1$—CHY—, $R^2$O—, $R^5R^4$N—, $(R^3O)_2$CY—, or $R^6$—C(=O)—$CY_2$—;

each Y independently represents a fluorine atom, a chlorine atom, a bromine atom or a hydrogen atom; le represents an aliphatic hydrocarbon group having 1 to 19 carbon atoms or a phenyl group; $R^2$ represents an aliphatic hydrocarbon group having 1 to 20 carbon atoms; $R^3$ represents an aliphatic hydrocarbon group having 1 to 16 carbon atoms; each of $R^4$ and $R^5$ independently represents an aliphatic hydrocarbon group having 1 to 18 carbon atoms; and $R^6$ represents an aliphatic hydrocarbon group having 1 to 19 carbon atoms, a hydroxyl group or a group represented by a formula AgO—;

each X independently represents a hydrogen atom, an aliphatic hydrocarbon group having 1 to 20 carbon atoms, a halogen atom, a phenyl group or benzyl group in which one or more hydrogen atoms may be substituted with a substituent, a cyano group, an N-phthaloyl-3-aminopropyl group, a 2-ethoxyvinyl group, or a group represented by general formula $R^7$O—, $R^7$S—, $R^7$—C(=O)— or $R^7$—C(=O)—O—; and $R^7$ represents an aliphatic hydrocarbon group having 1 to 10 carbon atoms, a thienyl group, or a phenyl group or diphenyl group in which one or more hydrogen atoms may be substituted with a substituent.

10. The silver ink composition according to claim 9, wherein said R represents a linear or branched alkyl group, a phenyl group, or a group represented by the general formula $R^6$—C(=O)—$CY_2$—, and the X represents a hydrogen atom, a linear or branched alkyl group, or a benzyl group.

11. The silver ink composition according to claim 9, wherein said silver β-ketocarboxylate is at least one selected from the group consisting of silver 2-methylacetoacetate, silver acetoacetate, silver 2-ethylacetoacetate, silver propionylacetate, silver isobutyrylacetate, silver pivaloylacetate, silver 2-n-butylacetoacetate, silver 2-benzylacetoacetate, silver benzoylacetate, silver pivaloylacetoacetate, silver isobutyrylacetoacetate and silver acetonedicarboxylate.

12. The silver ink composition according to claim 1, wherein an aliphatic hydrocarbon group bonded to a nitrogen atom of said primary amine or secondary amine is a linear or branched alkyl group.

13. The silver ink composition according to claim 1, wherein said primary amine or secondary amine is at least one selected from the group consisting of 2-ethylhexylamine, n-propylamine, n-butylamine, n-pentyl amine, n-hexylamine, n-heptylamine, n-octylamine, N-methylhexylamine and N-ethylhexylamine.

14. The silver ink composition according to claim 1, wherein said R' and R" are linear or branched alkyl groups having 1 to 10 carbon atoms.

15. The silver ink composition according to claim 1, wherein said acetylene alcohol is at least one selected from the group consisting of 3,5-dimethyl-1-hexyn-3-ol, 3-methyl-1-butyn-3-ol and 3-methyl-1-pentyn-3-ol.

16. A silver ink composition comprising:
a silver carboxylate having a group represented by a formula —COOAg;
an aliphatic primary amine or secondary amine having 2 to 10 carbon atoms;
an acetylene alcohol represented by a general formula (2) shown below; and
a hydrocarbon having 6 to 20 carbon atoms which is selected from the group consisting of an unsaturated hydrocarbon having a double bond, a linear or branched saturated hydrocarbon having 10 to 20 carbon atoms, and a cyclic saturated hydrocarbon having 6 to 20 carbon atoms;
wherein a viscosity at 27° C. of the composition is 40 mPa·s or less,

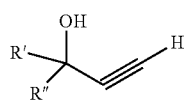
(2)

wherein each of R' and R" independently represents an alkyl group having 1 to 20 carbon atoms or a phenyl group in which one or more hydrogen atoms may be substituted with a substituent.

17. A silver ink composition comprising:
a silver carboxylate having a group represented by a formula —COOAg;
an aliphatic primary amine or secondary amine having 2 to 10 carbon atoms;
an acetylene alcohol represented by a general formula (2) shown below; and
a hydrocarbon having 6 to 20 carbon atoms wherein the hydrocarbon is an unsaturated hydrocarbon having a double bond;
wherein a viscosity at 27° C. of the composition is 40 mPa·s or less,

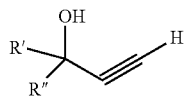
(2)

wherein each of R' and R" independently represents an alkyl group having 1 to 20 carbon atoms or a phenyl group in which one or more hydrogen atoms may be substituted with a substituent.

* * * * *